April 7, 1925.                                                                     1,532,121
C. R. BUTLER
PISTON
Filed April 17, 1922

INVENTOR
Charles R. Butler,
BY
ATTORNEY

Patented Apr. 7, 1925.

1,532,121

UNITED STATES PATENT OFFICE.

CHARLES R. BUTLER, OF INDIANAPOLIS, INDIANA.

PISTON.

Application filed April 17, 1922. Serial No. 553,424.

*To all whom it may concern:*

Be it known that I, CHARLES R. BUTLER, a citizen of the United States, residing at Indianapolis, in the county of Marion and State of Indiana, have invented a new and useful Piston, of which the following is a specification.

The use of light-weight metals, such as aluminum and aluminum alloys, has many advantages in making pistons of internal combustion engines, because of the light weight and because of the bearing-metal qualities of these metals. However, these metals have the disadvantage of large expansion, due to their large coefficient of expansion relative to that of the cast iron of the cylinder, so that it has been necessary to make them with a large clearance in the cylinder in order to prevent them from binding when they get hot. This difficulty has long been recognized, and many attempts to overcome it in connection with aluminum pistons have already been made.

It is the object of my present invention to overcome in a simple and effective manner this difficulty in the use of light-metal pistons, and to produce a piston made of a light-weight metal and with all the advantages thereof, but in which the expansion is controlled so that the effective diameter of the piston varies substantially according to the coefficient of expansion of iron or steel, or even less rapidly, rather than according to that of the light-weight metal which is mainly used in the construction of the piston, that very small clearances may be used.

In carrying out my invention, fundamentally, I make the piston skirt in several separate sections, the sections in the plane of the wrist-pin preferably being integral with the piston head; and I connect these separated segments by one or more continuous iron or steel rings which are sufficiently embedded in the wall of the piston skirt so that preferably the metal of the skirt lies against the rings both inside and outside thereof. These rings are more rigid than the light metal of the piston skirt, and control the expansion of the skirt segments so that such expansion is fundamentally that of the iron or steel ring or rings while the excess expansion of the light metal is compelled to be circumferential along the periphery of the rings rather than diametrical.

Figure 1:
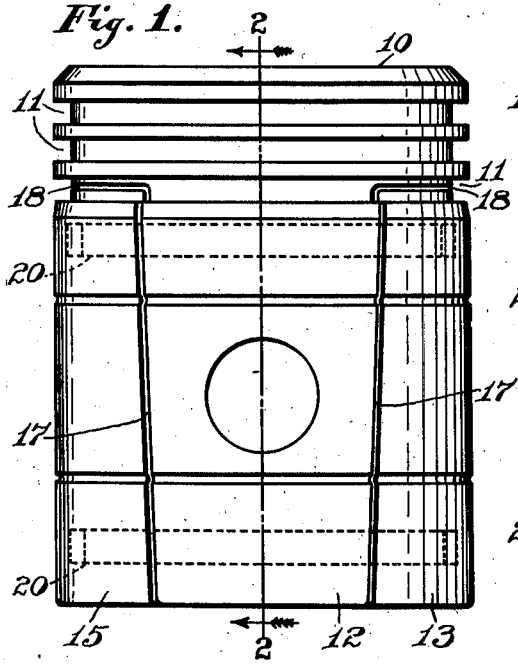
Figure 2:
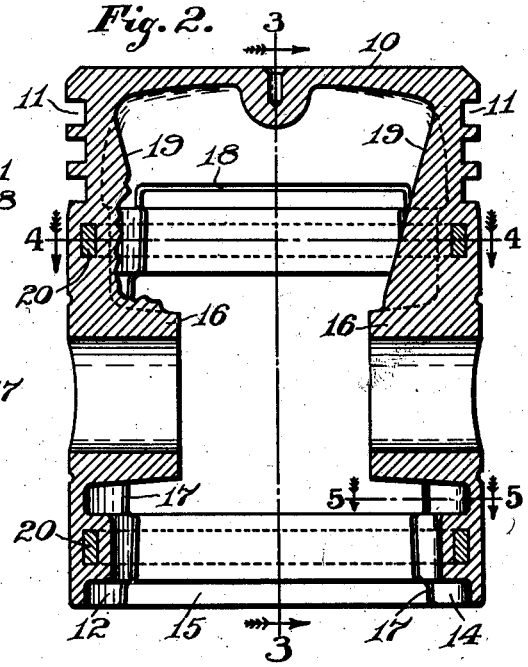
Figure 3:
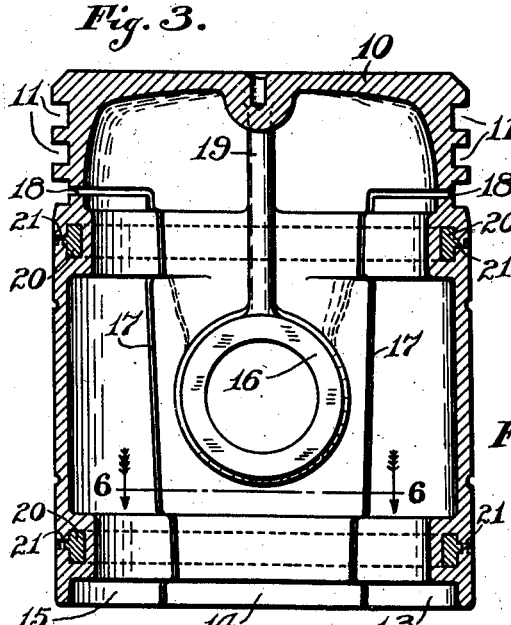
Figure 4:
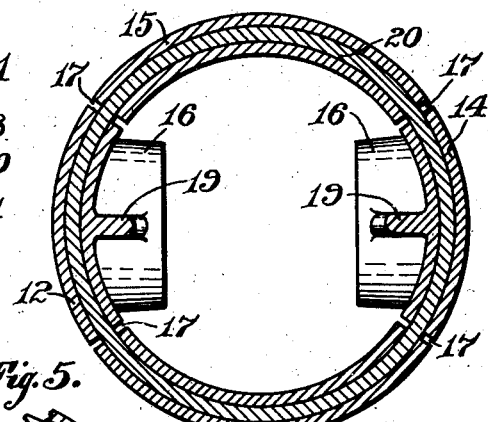
Figure 5:
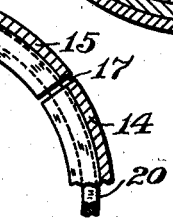
Figure 6:
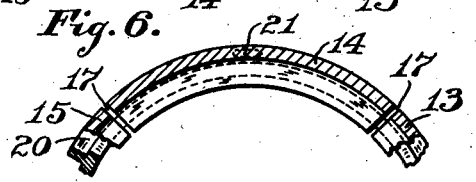

The accompanying drawing illustrates my invention: Fig. 1 is a side elevation of a piston embodying my invention; Fig. 2 is a longitudinal central section through such piston, substantially on the line 2—2 of Fig. 1; Fig. 3 is a longitudinal central section through the piston, substantially on the line 3—3 of Fig. 2, but with a slightly modified type of ring; Fig. 4 is a transverse section, substantially on the line 4—4 of Fig. 2; Fig. 5 is a fragmental section substantially on the line 5—5 of Fig. 2, showing the type of reinforcing ring shown in Fig. 2; and Fig. 6 is a fragmental section substantially on the line 6—6 of Fig. 3, showing the type of the reinforcing ring shown in Fig. 3.

The piston shown has the usual head 10 with its piston-ring grooves 11, and a skirt which is divided into four segments, 12, 13, 14, and 15. This specific number of segments is not essential to my invention; but is a desirable number, so that the sections 12 and 14 may be provided with the two wrist-pin bosses 16 respectively and may be continuous with the piston head 10, and so that the sections 13 and 15 which take the lateral component of thrust against the cylinder wall may be unbroken on their surfaces which mainly transmit such lateral thrust. The sections 13 and 15 are separated from the sections 12 and 14 by longitudinally extending slots 17, which are preferably slightly oblique to avoid scoring of the cylinder wall; and they are separated from the piston head 10 by transverse slots 18 which at their inner ends join the upper ends of the slots 17, as is clear from Figs. 1, 2, and 3. The slots 17 and 18 are conveniently saw-kerfs. The slots 18 are preferably located in the lowermost piston-ring groove 11, as is shown in Fig. 1, to provide relief during the movement of the piston, and to provide for the transmission of thrust from the piston-head to the skirt sections 13 and 15 through the lowermost piston ring.

Any suitable provision may be made for transmitting thrust from the piston head to the wrist pin bosses 16. I prefer to do this by a radial rib 19 extending from the middle of each wrist-pin boss 16 upward to the head 10, as is indicated in Figs. 2 and 4; but this longitudinal-thrust-transmitting rib reinforcement is not essential to my invention in its broader aspect, and may be omitted or varied as desired.

Though the slots 17 and 18 separate adjacent sections, so far as the main metal of the piston is concerned, such sections are interconnected by rings 20 of another metal. These rings 20 are made of a metal with a low thermal co-efficient of expansion, such as iron or steel, preferably steel for strength, while the remainder of the piston is made of such light metal, such as aluminum or aluminum alloy, having a higher co-efficient of expansion. The rings 20 are continuous rings, and are tight on the piston body at all times, and may take various forms. In the form shown in Fig. 2, the rings 20 are of rectangular cross-section, and are completely embedded in thickened parts of the wall of the piston skirt, with no surfaces exposed except at the slots 17, which such rings cross. In Fig. 3, the rings 20 are of T-shaped cross-section, with the stem of the T pointing outward; and the end of this T-stem may be flush with the outer surface of the piston if desired, as Fig. 3 shows. In both of these cases, the stiffening rings 20 have the light metal of the piston against them both radially inward and radially outward thereof. If desired, the rings 20 may be interlocked to the several segments, preferably at about the middle of the length of the segment arc. This may be done in the arrangement shown in Figs. 3 and 5, where the cross-section of the ring is T-shaped, by providing the stem of the T with holes 21 at the desired interlocking points, which holes 21 are filled by the metal of the piston body when the piston is cast. There may be any desired number of the rings 20, but I have found in practice that two rings give very satisfactory results, one located above the bosses 16 and one below such bosses, as Figs. 1, 2, and 3 show.

In operation, the rings 20 control the expansion of the piston skirt. They are made of metal which is stronger than the body of such skirt, and they compel such skirt body to expand in definite directions and with definite restrictions. The coefficient of expansion of steel or iron is less than that of aluminum or ordinary aluminum alloys. When the piston is heated in operation, the strong rings 20 hold the body of the piston from expanding diametrically as it would ordinarily do in conformity with its own coefficient of expansion, but the several segments 12, 13, 14, and 15 are permitted to expand circumferentially, to narrow the slots 17 slightly. This reduces the diametrical expansion of the piston from the value called for by the coefficient of expansion on the metal of the piston body of a value of the order of that demanded by the coefficient of expansion of the metal of rings 20.

In consequence, because of this reduction in diametrical expansion on heating, the piston may be made of a light metal, having a greater coefficient of expansion than cast iron, as have aluminum and aluminum alloys, and yet can be made with a small clearance from the cylinder, without producing any danger of binding. This clearance from the cylinder may be even smaller than with cast-iron pistons, because of the bearing-qualities of aluminum or aluminum alloys, permitting operation with a thinner film of oil on the cylinder wall, and because of the high heat conductivity of such metal, so that the piston keeps cooler than a cast-iron piston.

The head of the piston, above the upper ring 20, is provided with larger clearances, by making the lands between the piston ring grooves 11 of smaller diameter than the piston skirt. This conforms to general practice.

In addition to the effect above described, there is a further effect which makes possible an even smaller clearance on the controlling diameter, because it reduces the expansion on such controlling diameter to a value even less than that which would be required if the coefficient of expansion were that of cast iron. The skirt segments 12 and 14 are continuous with the piston head 10. The piston head 10 expands as required by the coefficient of expansion of the light metal used, such as aluminum or aluminum alloy. This acts to force apart, mechanically, the skirt segments 12 and 14, because they are continuous with the head. This greater expansion therefore produces a slight distortion of the ring 20, so that its diameter lengthens in the line of the wrist-pin, or in the line connecting the middles of the two skirt segments 12 and 14 which are continuous with the piston head; and this lengthening of this diameter of the ring 12 causes a relative shortening (although there is an absolute lengthening) of the diameter at 90° therefrom, so that the diameter connecting the middles of the segments 13 and 15 is even less than it would otherwise be. This last-named diameter, between the middles of the segments 13 and 15 which are not continuous with the piston head 10, is the controlling diameter, because it is the diameter of that part of the piston which must carry the lateral component of thrust from the piston to the cylinder. Therefore, these segments 13 and 15 which take this lateral thrust may be made to fit very closely to the cylinder, with a very small clearance. This effectually prevents slapping. To permit this distortion, the skirt segments 12 and 14, especially at their upper ends where they join the piston head 10, are slightly relieved, so that they will be free to have this greater expansion diametrically than have the segments 13 and 15; but this relief does not interfere with the functioning of the pistons, as there is substantially no thrust between such segments 12 and 14 and the cylinder, and it is common practice to provide relief at these points.

To add to this differential expansion effect in the piston on the two diameters, and thus to reduce further the expansion on the diameter connecting the middles of the segments 13 and 15, I may provide the re-inforcing ribs 19 already referred to. These ribs provide additional metal in the longitudinal plane of the wrist-pin, so that because of such additional metal the tendency of the aluminum or aluminum alloy to have greater expansion than has the re-inforcing ring 20 has still greater effect in the plane of such ribs. This produces a greater bulging out of the ring 20 in the diameter which is in line with the wrist-pin, and therefore a greater pulling together of those parts of the ring 20 which are removed 90° circumferentially from the longitudinal plane of the wrist-pin. The rib 19, however, although desirable, is not essential to my invention in its broader aspect; and when used need not be located precisely as shown, and need not be a single rib, though that is the construction I prefer.

I claim as my invention:

1. A metal piston, having a skirt which is divided into a plurality of separated segments, and one or more continuous rings of a metal having a smaller co-efficient of expansion than that of the metal of which the piston is made, said rings being located in the wall of said skirt with piston metal against them both radially inward and radially outward thereof, there being one such ring near the head end of the skirt.

2. A piston, having a skirt which is divided into a plurality of separated segments and made of non-ferrous metal, one or more continuous rings of ferrous metal located in the wall of said skirt and tight against the non-ferrous metal at all times, two opposite segments being provided with wrist-pin bosses and being integral with the piston head, and segments on a diameter transverse to the axis of the wrist-pin bosses being separated from the piston head as well as from the segments having said bosses.

3. A piston, having a skirt which is divided into a plurality of separated segments and made of non-ferrous metal, one or more continuous rings of ferrous metal located in the wall of said skirt and tight against the non-ferrous metal at all times, two opposite segments being provided with wrist-pin bosses and being integral with the piston head, and segments on a diameter transverse to the axis of the wrist-pin bosses being separated from the piston head as well as from the segments having said bosses, said piston having a re-inforcing rib of non-ferrous metal connecting the head and the bosses, and said skirt when cold being of slightly smaller diameter at said ring in the plane of said wrist-pin bosses than in the plane perpendicular thereto.

4. A piston, comprising a head and a skirt, said skirt having two opposite wrist-pin-carrying segments integral with the head and also having two segments at 90 degrees circumferentially from the wrist-pin-carrying segments and separated from said latter segments and from the piston head, and a continuous re-inforcing ring of a metal having a less coefficient of expansion than have the skirt segments and embedded in and interconnecting said skirt segments.

5. A piston, comprising a head and a skirt, said skirt having two pairs of skirt segments on perpendicular diameters, and a continuous re-inforcing ring embedded in the wall of said skirt segments and interconnecting said segments, said ring being of a metal having a smaller coefficient than have said skirt segments, one of said pairs of skirt segments being provided with wrist-pin bosses and being connected to said head by ribs of greater coefficient of expansion than has such ring.

6. A piston, comprising a head and a skirt having wrist-pin bosses, and a combination of re-inforcing parts in said piston for giving said skirt between the wrist-pin bosses and the piston head an effective coefficient of expansion which is positive but is less than that of cast iron on the diameter perpendicular to the wrist-pin bosses.

7. A piston, comprising a head and a skirt, said skirt being of non-ferrous metal having a greater coefficient of expansion than has cast iron, and being provided with wrist-pin bosses, and re-inforcing means in said piston for permitting it when heated to expand but for compelling it to expand less in the diameter perpendicular to said wrist-pin bosses than would be required for normal expansion if the coefficient of expansion were that of cast iron.

8. A piston, having a skirt which is divided into a plurality of separated segments and made of non-ferrous metal, one or more continuous rings of ferrous metal located in the wall of said skirt and tight against the non-ferrous metal at all times, two opposite segments being provided with wrist-pin bosses and being integral with the piston head, and segments on a diameter transverse to the axis of the wrist-pin bosses being separated from the piston head as well as from the segments having said bosses, said piston having a re-inforcing rib connecting the head and the bosses.

9. A piston, comprising a head and a skirt, said skirt having two pairs of skirt segments on perpendicular diameters, and a continuous re-inforcing ring embedded in the wall of said skirt segments and interconnecting said segments, said ring being of a metal having a smaller coefficient than have said skirt segments, one of said pairs of skirt segments being provided with wrist-pin bosses and being connected to said head, said ring being between the wrist-pin axis and the piston head.

10. A piston, having a skirt which is divided into a plurality of separated segments and made of non-ferrous metal, one or more continuous rings of ferrous metal located in the wall of said skirt and tight against the non-ferrous metal at all times, two opposite segments being provided with wrist-pin bosses and being integral with the piston head, said piston having a re-inforcing rib of non-ferrous metal connecting the head and the bosses.

11. A piston, having a skirt which is divided into a plurality of separated segments and made of non-ferrous metal, one or more continuous rings of ferrous metal located in the wall of said skirt and tight against the non-ferrous metal at all times, two opposite segments being provided with wrist-pin bosses and being integral with the piston head, said piston having a re-inforcing rib of non-ferrous metal connecting the head and the bosses, and said skirt when cold being of slightly smaller diameter at said ring in the plane of said wrist-pin bosses than in the plane perpendicular thereto.

12. A piston, comprising a head and a skirt, said skirt having two opposite wrist-pin-carrying segments integral with the head, and a continuous re-inforcing ring of a metal having a less coefficient of expansion than have the skirt segments and embedded in and interconnecting said skirt segments between the wrist-pin axis and the head-ends of said skirt segments.

13. A piston, comprising a head and a skirt, said skirt having two diametrically opposite skirt segments, and a continuous re-inforcing ring embedded in the wall of said skirt segments and interconnecting said segments, said ring being of a metal having a smaller coefficient than have said skirt segments, said skirt segments being provided with wrist-pin bosses and being connected to said head by ribs of greater coefficient of expansion than has such ring.

14. A piston, having a skirt which is divided into a plurality of separated segments and made of non-ferrous metal, one or more continuous rings of ferrous metal located in the wall of said skirt and tight against the non-ferrous metal at all times, two opposite segments being provided with wrist-pin bosses and being integral with the piston head, said piston having a re-inforcing rib connecting the head and the bosses.

15. A piston, comprising a head and a skirt, said skirt being made of non-ferrous metal and having wrist-pin bosses, said skirt being provided with a longitudinal slot and with a transverse slot which latter slot extends inward from the circumference between the head and the wrist-pin axis but stops before reaching the longitudinal plane of the wrist-pin bosses, said longitudinal slot opening into said transverse slot, and one or more continuous rings of reinforcing metal located in the wall of said skirt and crossing said longitudinal slot.

16. A piston, comprising a head and a skirt, said skirt being made of non-ferrous metal and having wrist-pin bosses, said skirt being provided on each side of the longitudinal plane of the wrist-pin bosses with a longitudinal slot and with a transverse slot which latter slot extends inward from the circumference between the head and the wrist-pin axis but stops before reaching the longitudinal plane of the wrist-pin bosses, each longitudinal slot opening into a transverse slot, and one or more continuous rings of reinforcing metal located in the wall of said skirt and crossing said longitudinal slots.

17. A piston, comprising a head and a skirt, said skirt being made of non-ferrous metal and having wrist-pin bosses, said skirt being provided with a longitudinal slot and with a transverse slot which latter slot extends inward from the circumference between the head and the wrist-pin axis but stops before reaching the longitudinal plane of the wrist-pin bosses, said longitudinal slot opening into said transverse slot, and one or more continuous rings of reinforcing metal located in the wall of said skirt and crossing said longitudinal slot, there being one such ring in a transverse plane between that of the wrist-pin axis and that of said transverse slot.

18. A piston, comprising a head and a skirt, said skirt being made of non-ferrous metal and having wrist-pin bosses, said skirt being provided on each side of the longitudinal plane of the wrist-pin bosses with a longitudinal slot and with a transverse slot which latter slot extends inward from the circumference between the head and the wrist-pin axis but stops before reaching the longitudinal plane of the wrist-pin bosses, each longitudinal slot opening into a transverse slot, and one or more continuous rings of reinforcing metal located in the wall of said skirt and crossing said longitudinal slots, there being one such ring in a transverse plane between that of the wrist-pin axis and that of said transverse slots.

19. A piston, comprising a head and a skirt, said skirt being made of non-ferrous metal and having wrist-pin bosses, said skirt being provided with a longitudinal slot extending across the transverse plane of the wrist-pin bosses and with a transverse slot located between the piston head and the transverse plane of the wrist-pin bosses and into which said longitudinal slot opens, and a ring of reinforcing metal located in the wall of the skirt in a plane between said transverse slot and the transverse plane of the wrist-pin bosses and crossing said longitudinal slot.

20. A piston, comprising a head and a skirt having wrist-pin bosses, and a combination of re-inforcing parts in said piston for giving said skirt between the wrist-pin bosses and the piston head an effective coefficient of expansion less than that of cast iron on the diameter perpendicular to the wrist-pin bosses, said re-inforcing parts including a part which is of different material from the body of the piston and lies wholly below the piston-ring grooves of the piston head.

21. A piston, comprising a head and a skirt, said skirt being of non-ferrous metal having a greater coefficient of expansion than has cast iron and being provided with wrist-pin bosses, and reinforcing means in said piston for compelling it when heated to expand less in the diameter perpendicular to said wrist-pin bosses than would be required for normal expansion if the coefficient of expansion were that of cast iron, said re-inforcing means including one or more parts which are of different metal from the body of the skirt and lie wholly below the piston-ring grooves of the piston head.

In witness whereof, I have hereunto set my hand at Indianapolis, Indiana, this 11th day of April, A. D. one thousand nine hundred and twenty two.

CHARLES R. BUTLER.